US011773642B2

(12) United States Patent
Mazuir et al.

(10) Patent No.: US 11,773,642 B2
(45) Date of Patent: Oct. 3, 2023

(54) LIGHT TRANSMITTING PANEL WITH ACTIVE COMPONENTS

(71) Applicants: Clarisse Mazuir, San Jose, CA (US); Marcelo B. da Silveira Magalhaes, Pleasanton, CA (US); Peter F. Masschelein, Campbell, CA (US); Gregory A. Cohoon, Sunnyvale, CA (US); Derek C. Scott, Melbourne (AU); David E. Kingman, San Francisco, CA (US)

(72) Inventors: Clarisse Mazuir, San Jose, CA (US); Marcelo B. da Silveira Magalhaes, Pleasanton, CA (US); Peter F. Masschelein, Campbell, CA (US); Gregory A. Cohoon, Sunnyvale, CA (US); Derek C. Scott, Melbourne (AU); David E. Kingman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/975,161

(22) Filed: Oct. 27, 2022

(65) Prior Publication Data
US 2023/0039452 A1    Feb. 9, 2023

Related U.S. Application Data

(63) Continuation of application No. 17/235,056, filed on Apr. 20, 2021, now Pat. No. 11,505,987, which is a
(Continued)

(51) Int. Cl.
*E06B 3/663*    (2006.01)
*E06B 3/67*    (2006.01)
(Continued)

(52) U.S. Cl.
CPC .............. *E06B 3/6722* (2013.01); *E06B 3/66* (2013.01); *E06B 3/66376* (2013.01); *E06B 7/28* (2013.01);
(Continued)

(58) Field of Classification Search
CPC ...... E06B 3/66; E06B 3/66376; E06B 3/6722; G02F 1/19
(Continued)

(56) References Cited

U.S. PATENT DOCUMENTS 5,115,346 A    5/1992    Lynam
5,239,406 A    8/1993    Lynam
(Continued)

FOREIGN PATENT DOCUMENTS

CA    2077502 A1    3/1994
CA    2416264 A1    1/2002
(Continued)

OTHER PUBLICATIONS

International Search Report and Written Opinion issued in co-pending Intl. Application No. PCT/US2018/053121 dated Dec. 21, 2018 (10 pp).

*Primary Examiner* — Christopher M Raabe
(74) *Attorney, Agent, or Firm* — Young Basile Hanlon & MacFarlane, P.C.

(57) ABSTRACT

A light transmitting panel assembly includes a first panel, a second panel, a frame, a gap between the first panel and the second panel, and a first active component located between the first panel and the second panel.

22 Claims, 9 Drawing Sheets

Related U.S. Application Data continuation of application No. 15/983,152, filed on May 18, 2018, now Pat. No. 11,015,384.

(60) Provisional application No. 62/571,470, filed on Oct. 12, 2017, provisional application No. 62/516,718, filed on Jun. 8, 2017.

(51) Int. Cl.

| | | |
|---|---|---|
| *F21V 8/00* | (2006.01) | |
| *G02F 1/1523* | (2019.01) | |
| *G02F 1/19* | (2019.01) | |
| *E06B 7/28* | (2006.01) | |
| *G02F 1/137* | (2006.01) | |
| *E06B 9/24* | (2006.01) | |
| *E06B 3/66* | (2006.01) | |
| *G02F 1/13357* | (2006.01) | |
| *G02F 1/1334* | (2006.01) | |
| *G02F 1/1343* | (2006.01) | |
| *G02F 1/1339* | (2006.01) | |
| *E06B 3/56* | (2006.01) | |
| *G02F 1/1335* | (2006.01) | |

(52) U.S. Cl.
CPC ............... *E06B 9/24* (2013.01); *G02B 6/009* (2013.01); *G02B 6/0088* (2013.01); *G02B 6/0091* (2013.01); *G02F 1/137* (2013.01); *G02F 1/133615* (2013.01); *G02F 1/1523* (2013.01); *G02F 1/19* (2013.01); *E06B 3/56* (2013.01); *E06B 3/6612* (2013.01); *E06B 3/6617* (2013.01); *E06B 3/6715* (2013.01); *G02F 1/1334* (2013.01); *G02F 1/1339* (2013.01); *G02F 1/13439* (2013.01); *G02F 1/133565* (2021.01); *G02F 2203/01* (2013.01); *G02F 2203/02* (2013.01)

(58) Field of Classification Search
USPC ........................................................ 362/606
See application file for complete search history.

(56) References Cited

U.S. PATENT DOCUMENTS

| | | |
|---|---|---|
| 7,991,257 B1 | 8/2011 | Coleman |
| 8,488,246 B2 | 7/2013 | Border et al. |
| 2004/0031234 A1 | 2/2004 | Emde |
| 2005/0233125 A1 | 10/2005 | Anderson et al. |
| 2009/0033833 A1 | 2/2009 | Aminaka |
| 2009/0176101 A1 | 7/2009 | Greenall et al. |
| 2010/0315693 A1 | 12/2010 | Lam et al. |
| 2011/0051221 A1 | 3/2011 | Veerasamy |
| 2011/0267833 A1 | 11/2011 | Verrat-Debailleul et al. |
| 2012/0021149 A1 | 1/2012 | Myli et al. |
| 2012/0212399 A1 | 8/2012 | Border et al. |
| 2012/0236031 A1 | 9/2012 | Haddick et al. |
| 2013/0278989 A1 | 10/2013 | Lam et al. |
| 2013/0307420 A1 | 11/2013 | Yoder et al. |
| 2014/0300945 A1 | 10/2014 | Parker |
| 2015/0205034 A1 | 7/2015 | Facke et al. |
| 2015/0219830 A1 | 8/2015 | Nohara et al. |
| 2015/0253486 A1 | 9/2015 | Verger et al. |
| 2017/0114588 A1 | 4/2017 | Fukuda et al. |
| 2018/0373082 A1 | 12/2018 | Kitamura et al. |
| 2019/0011113 A1 | 1/2019 | Nakajima et al. |
| 2022/0179274 A1* | 6/2022 | Trikha ................ H01L 27/3234 |

FOREIGN PATENT DOCUMENTS

| | | | |
|---|---|---|---|
| CA | 2786872 | A1 | 7/2011 |
| CN | 205696654 | U | 11/2016 |
| CN | 205893784 | U | 1/2017 |
| CN | 206503500 | U | 9/2017 |
| DE | 102008012383 | B3 | 6/2009 |
| EP | 3192958 | A1 | 7/2017 |
| JP | 2004505298 | A | 2/2004 |
| JP | 2005502578 | A | 1/2005 |
| JP | 2007004085 | A | 1/2007 |
| JP | 2009209680 | A | 9/2009 |
| JP | 2014505971 | A | 3/2014 |
| JP | 2015045217 | A | 3/2015 |
| JP | 2016141573 | A | 8/2016 |
| JP | 2017527510 | A | 9/2017 |
| WO | 0208826 | A1 | 1/2002 |
| WO | 2015190111 | A1 | 12/2015 |
| WO | 2017122245 | A1 | 7/2017 |

\* cited by examiner

LIGHT TRANSMITTING PANEL WITH ACTIVE COMPONENTS

CROSS-REFERENCE TO RELATED APPLICATIONS

This application is a continuation of U.S. patent application Ser. No. 17/235,056, filed Apr. 20, 2021 and entitled "Light Transmitting Panel with Active Components," which is a continuation of U.S. patent application Ser. No. 15/983,152, filed May 18, 2018 and entitled "Light Transmitting Panel with Active Components," which claims the benefit of U.S. Provisional Application No. 62/516,718, filed Jun. 8, 2017 and entitled "Light Transmitting Panel with Active Components," and which also claims the benefit of U.S. Patent Application No. 62/571,470, filed Oct. 12, 2017 and entitled "Light Transmitting Panel with Active Components." The contents of the foregoing applications are incorporated herein by reference in their entireties for all purposes.

TECHNICAL FIELD

The application relates generally to light transmitting panels.

BACKGROUND

Panels made of glass and some plastics allow transmission of light, and may also allow transmission of heat and sound.

SUMMARY

One aspect of the disclosed embodiments a light transmitting panel assembly. The light transmitting panel assembly includes a first panel, a second panel, a gap between the first panel and the second panel, a first active component located in the gap, and a second active component located in the gap. The first active component has a controllable light transmission characteristic, and the second active component has a controllable light emission characteristic.

Another aspect of the disclosed embodiments is a light transmitting panel assembly. The light transmitting panel assembly includes a first laminated panel that includes a first transparent layer and a first active layer, a second laminated panel that includes a second transparent layer and a second active layer, and a gap between the first laminated panel and the second laminated panel.

An assembly includes a frame and a light transmitting panel assembly. The light transmitting panel assembly is supported by the frame, has a first portion exposed to an exterior space, and a second portion exposed to an interior space. The light transmitting panel assembly includes a first light transmitting layer, a second light transmitting layer, a switchable mirror component, and a light emitting component, wherein the switchable mirror component is located between the light emitting component and the exterior space.

DETAILED DESCRIPTION

The disclosure herein is directed to light transmitting panel assemblies, such as windows, that include transparent or translucent panels. The light transmitting panel assemblies include a first laminated panel structure and a second laminated panel structure that are separated by a gap, which may also be referred to as an air gap or a space.

In some implementations, the first laminated panel structure and the second laminated panel structure each include active, controllable components. As an example, the first laminated panel structure may incorporate a controllable variable light transmission device, and the second laminated panel structure may incorporate lighting. By laminating the active, controllable components into the first panel structure or the second panel structure, they can be separated from the exterior of the assembly by one or more other layers (e.g., transparent glass or plastic layers) such that the active, controllable components are protected from damage.

In other implementations, active, controllable components are disposed in or adjacent to the gap between the first panel and the second panel, without including the components in the laminated structure. This configuration which protects the components from damage while avoiding lamination of them as part of the first panel or the second panel.

Figure 1:
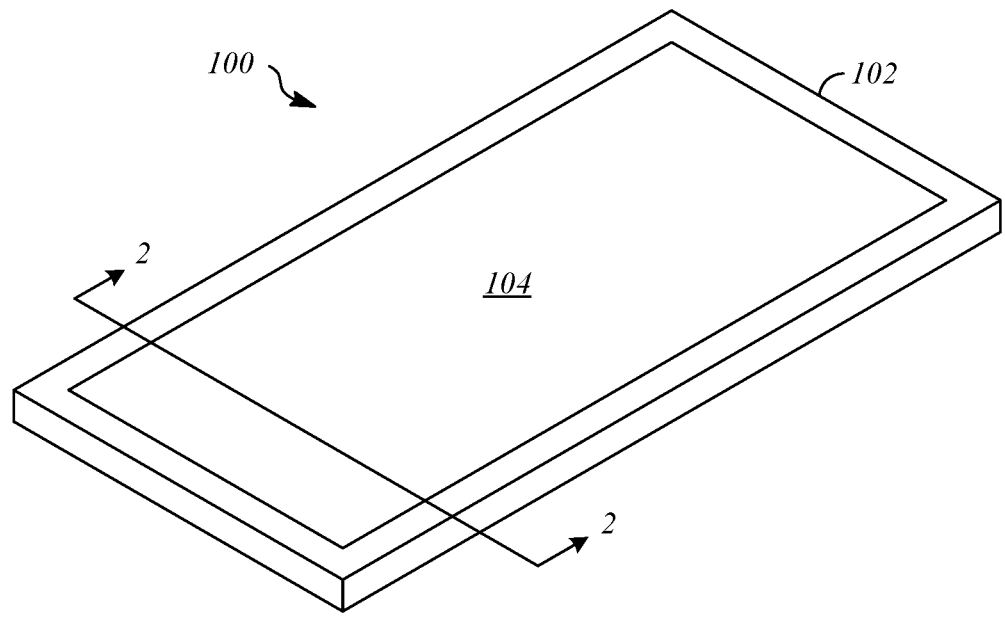
FIG. 1 is a perspective view illustration showing an assembly that includes a frame and a panel assembly according to a first implementation.

FIG. 1 is a perspective view illustration showing an assembly 100 that includes a frame 102 and a panel assembly 104. The panel assembly 104 is supported by the frame 102. In the illustrated example, the panel assembly 104 is surrounded peripherally by the frame 102 so that a peripheral edge of the panel assembly 104 is connected to and is supported by the panel assembly 104.

Figure 2:
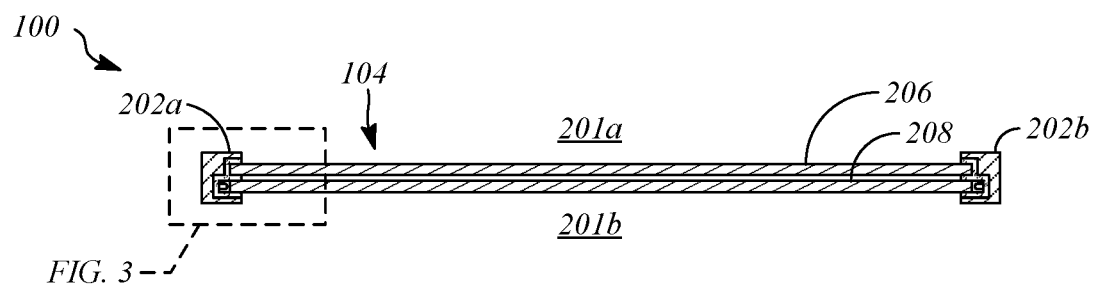
FIG. 2 is a cross-section view of the assembly taken along line 2-2 of FIG. 1, including a first panel and a second panel of the panel assembly.

FIG. 2 is a cross-section view of the assembly 100 taken along line 2-2 of FIG. 1. The panel assembly 104 extends between a first frame portion 202a of the frame 102 and a second frame portion 202b of the frame 102. The panel assembly 104 includes a first panel 206 and a second panel 208. The first panel 206 is positioned adjacent to a first side 201a of the assembly 100, and the second panel 208 is positioned adjacent to a second side 201b of the assembly 100. In a typical implementation, an exterior space is located on the first side 201a of the assembly 100 and an interior space is located on the second side 201b of the assembly 100. The interior space may be, as examples, an interior of a building or a passenger compartment of a vehicle.

As will be described further herein, active components are included in the first panel 206 and the second panel 208 to control transmission of light from the first side 201a of the assembly 100 to the second side 201b of the assembly 100. In particular, the first panel 206 has a variable light transmission characteristic, and the second panel 208 has a variable light emission characteristic. As an example, the first panel 206 may incorporate a variable light transmission technology to alter an amount of ambient light (e.g., sunlight) that passes from the first side 201a of the assembly 100 to the second side 201b of the assembly 100, and the second panel 208 may incorporate a lighting device that provides illumination to the space on the second side 201b of the assembly 100. Variable light transmission may also include switchable mirrors that change states between transparent and reflective. The active components can be controlled to provide illumination of a desired light intensity and light quality by mixing artificial light and natural light. As one example, by positioning a switchable mirror layer or component outward from a light emitting device, more light can be directed into an interior space. As one example, by positioning a variable tint layer or component outward from a light emitting device, less emitted light is directed to an exterior space. As one example, by positioning a variable tint layer or component outward from a light emitting device, ambient light can be blocked to allow control of light intensity and characteristics in the interior space.

Figure 3:
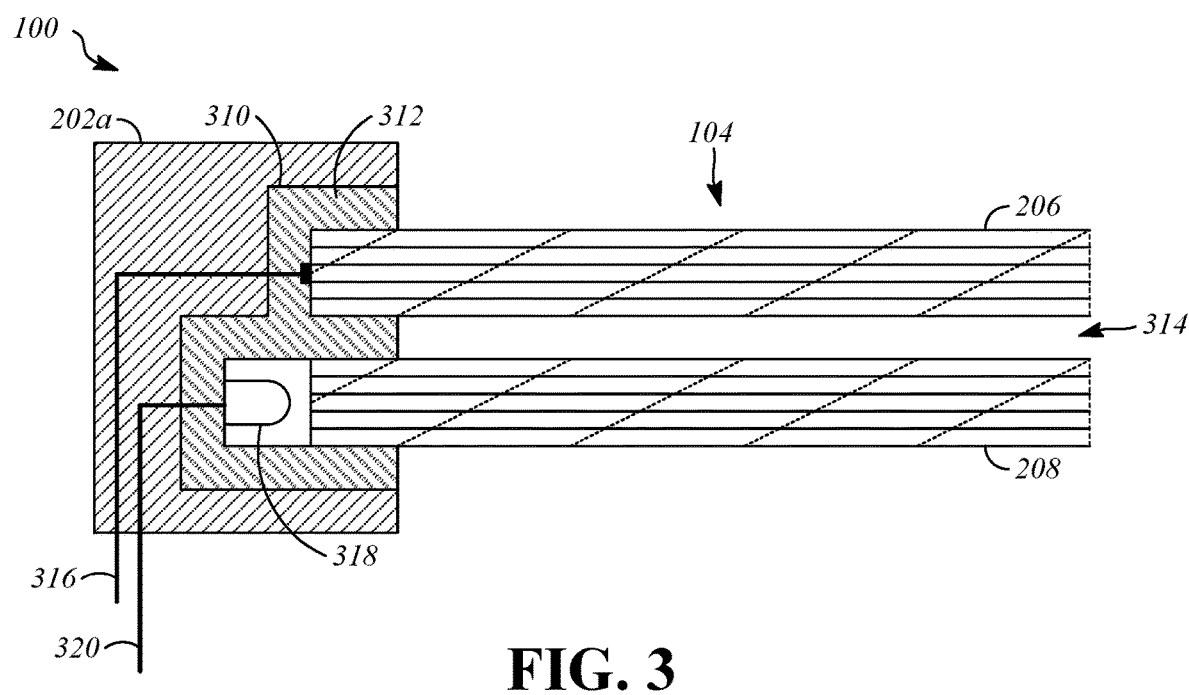
FIG. 3 is a detail view showing an area designated in FIG. 2, including an example of a connection of a first frame portion of the frame to the first panel and the second panel of the panel assembly of FIG. 1.

FIG. 3 is a detail view showing an area designated in FIG. 2, including an example of a connection of the first frame portion 202a of the frame 102 to the first panel 206 and the second panel 208 of the panel assembly 104. The first frame portion 202a of the frame 102 includes connecting structures that are engaged with edges of the first panel 206 and the second panel 208. In the illustrated example, a channel 310 is formed on a side surface of the first frame portion 202a and extends inward. A sealing structure 312 is disposed in the channel 310. The sealing structure 312 supports the first panel 206 and the second panel 208 relative to the first frame portion 202a. The sealing structure 312 may prevent passage of air and liquids, and may also cushion the first panel 206 and the second panel 208 relative to the first frame portion 202a of the frame 102.

The first panel 206 and the second panel 208 are supported such that a lower surface of the first panel 206 is spaced from an upper surface of the second panel 208. As an example, the frame 102, including the first frame portion 202a and the sealing structure 312, can be configured to maintain a desired spacing between the first panel 206 and the second panel 208. Thus, the frame 102 serves as a support structure that supports the first panel 206 with respect to the second panel 208, and the sealing structure 312 serves as a spacer to define a gap 314 between the first panel 206 and the second panel 208. The gap 314 is a space by which the first panel 206 and the second panel 208 are separated. The gap 314 may eliminate contact between the first panel 206 and the second panel 208 to reduce transmission of heat and sound between the first panel 206 and the second panel 208. In some implementations, the gap 314 is evacuated. In some implementations, the gap 314 is filled with a gas, such as argon or another noble gas, or a mixture of gases, such as air. In some implementations, the gap 314 may be filled with a liquid or gel, which may have an index of refraction that is matched to the first panel 206 and/or the second panel 208. In addition to the frame 102, spacers may be included adjacent to the frame to support the first panel 206 relative to the second panel 208 and to define the gap 314.

For example, separate channels can be formed in the frame 102 and/or the sealing structure 312 to space the first panel 206 from the second panel 208. The spacing between the first panel 206 and the second panel 208 defines the gap 314 between the first panel 206 and the second panel 208. As an example, the width of each of the first panel 206 and the second panel 208 may be between 2.0 mm and 8.0 mm, and the gap 314 may have a width between 2.0 mm and 12.0 mm. In one implementation, the gap 314 has a nominal width of 4.0 mm subject to manufacturing variations and deflections resulting from self-weight and/or external forces acting of the first panel 206 and the second panel 208. In some implementations, the width of the gap 314 is less than the width of the first panel 206 and the width of the gap 314 is also less than the width of the second panel 208. In some implementations, the width of the gap 314 is less than the width of at least one of the first panel 206 or the second panel 208. In some implementations, the width of the gap 314 is less than a combined width of the first panel 206 and the second panel 208.

In some implementations, the sealing structure 312 defines an airtight seal of the gap 314, such that outside air does not enter the gap 314. In embodiments in which the gap 314 is sealed relative to outside air, the gap 314 may be filled with air at atmospheric pressure, or a controlled atmosphere may be defined in the gap 314. In one implementation, the gap 314 is substantially evacuated and the pressure in the gap 314 is significantly less than atmospheric pressure. In other implementations, a gas or gas mixture other that ambient air may be present in the gap 314, such as substantially pure nitrogen. The gas or gas mixture that is present in the gap 314 may be selected to enhance noise and thermal insulation properties that are attributable to the gap 314.

The assembly 100 may be configured such that no intervening structures are present between the first panel 206 and the second panel 208 at locations inward from the frame 102. In such implementations, the gap 314 is continuous and uninterrupted at all locations inward from the frame 102. In other implementations, transparent spacers are positioned between the first panel 206 and the second panel 208 at locations inward from the frame 102. As one example, the spacers can be a layer of transparent material having limited longitudinal and lateral extents. As another example, the spacers can be elongate in the lateral or longitudinal directions. As another example, the spacers can include elongate lateral portions and elongate longitudinal portions that intersect each other in a grid. In such implementations, the gap 314 is disposed around and between the spacers, and may be divided into unconnected portions.

The first panel 206 is connected to a first electrical connection 316. The first electrical connection 316 is connected to a power source and/or to a controller to provide electrical power and/or control signals to one or more active components that are incorporated in the first panel 206.

A light source 318 is supported by the first frame portion 202a adjacent to the edge of the second panel 208. The light source 318 can extend along all or part of the periphery of the second panel 208. The light source 318, in combination with the structure of the second panel 208, as will be described herein, is an edge lighting assembly that directs light into the second panel 208 such that the light is carried through the second panel 208, and is emitted in a controlled manner, as will be discussed further herein. The light source 318 is connected to a second electrical connection 320. The second electrical connection 320 is connected to a power source and/or to a controller to allow the light source 318 to be activated and deactivated, to control an intensity of the light source 318, and/or to control a color of the light source 318. Other electrical connections may be provided to the second panel 208 in implementations in which other active components are included in the second panel 208.

Figure 4:
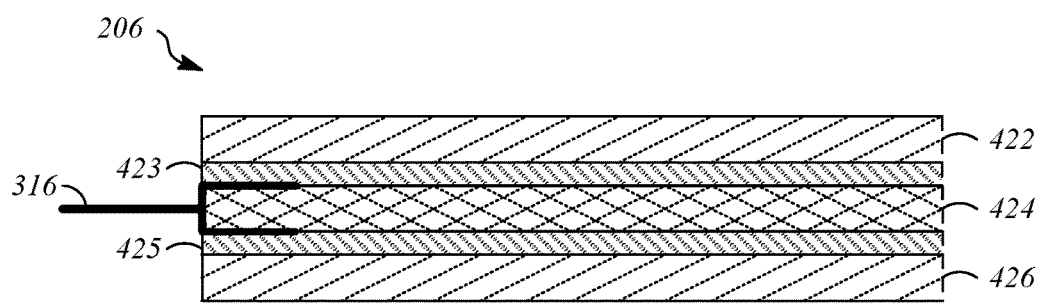
FIG. 4 is an illustration that shows a first example structure for the first panel of the panel assembly of FIG. 1.

FIG. 4 is an illustration that shows a first example structure for the first panel 206. The first panel 206 is a laminated panel formed from layers that are transparent or translucent, or are capable of being transparent or translucent subject to control of active components, as will be described. In this implementation, the first panel 206 includes, in top-to-bottom order, a first layer 422, a first interlayer 423, a second layer 424, a second interlayer 425, and a third layer 426, which are joined together in a lamination process, for example, including application of heat and pressure.

The first layer 422 and the third layer 426 are transparent layers. The first layer 422 and the third layer 426 may be free from active components. As one example, the first layer 422 and the third layer 426 may be formed from silicate glass, such as soda-lime glass. As another example, the first layer 422 and the third layer 426 may be formed from a transparent or translucent polymer or a transparent or translucent polycarbonate.

The second layer 424 incorporates a variable light transmission technology. The second layer 424 is controllable by a control signal that is provided to the second layer 424 using the first electrical connection 316 to modify a degree of light transmission through the first panel 206. For example, the degree of light transmitted through the first panel 206 may be controllable by a voltage of the control signal delivered to the second layer 424 by the first electrical connection 316. The first electrical connection 316 may incorporate transparent electrodes, such as indium tin oxide (ITO) electrodes, to allow control of the variable light transmission properties of the second layer 424.

The control signal may cause the second layer 424 to modify a current light transmittance characteristic such that, in response to the control signal, the second layer 424 is modified from having a first light transmittance value to having a second light transmittance value. Technologies that may be used to implement the second layer 424 include suspended particle devices, electrochromic devices, polymer dispersed liquid crystal (PLDC) devices, guest host liquid crystal (GHLC) devices, and switchable mirror devices. Some of these technologies are implemented in the form of a film, and in such implementations, the second layer 424 includes a variable light transmission film on a transparent structure such as glass or polycarbonate. As one example, the second layer 424 may include a polymer dispersed liquid crystal (PDLC) film, which is a voltage-controllable film containing liquid crystals dispersed in a polymer material. The PDLC film is transparent when a voltage above a threshold value is applied by the first electrical connection 316, and varies between transparent and opaque in correspondence to the voltage value below the threshold value. As another example, the second layer 424 may be a switchable mirror layer or include a switchable mirror film that is able to change states between a transparent or translucent state, and a reflective state. As an example, the state change can be induced by application of or cessation of application of a voltage to at least a portion of the second layer 424. As one example, the second layer 424 can incorporate a transition-metal hydride electrochromic device having reflective hydrides that change states between transparent or translucent and reflective upon application of a voltage. Other technologies can be used to implement a switchable mirror in the second layer 424.

The first layer 422 is bonded to the second layer 424 by the first interlayer 423, and the second layer 424 is bonded to the third layer 426 by the second interlayer 425. The first interlayer 423 and the second interlayer 425 may be transparent adhesive layers that bond adjacent panels together. Examples of materials that can be used as the first interlayer 423 and the second interlayer 425 include polyvinyl butyral (PVB) and ethylene-vinyl acetate (EVA). Other materials suitable for the first interlayer 423 and the second interlayer 425 include thermoset EVA, thermoplastic polyurethane (TPU), and polyester (PE).

Figure 5:
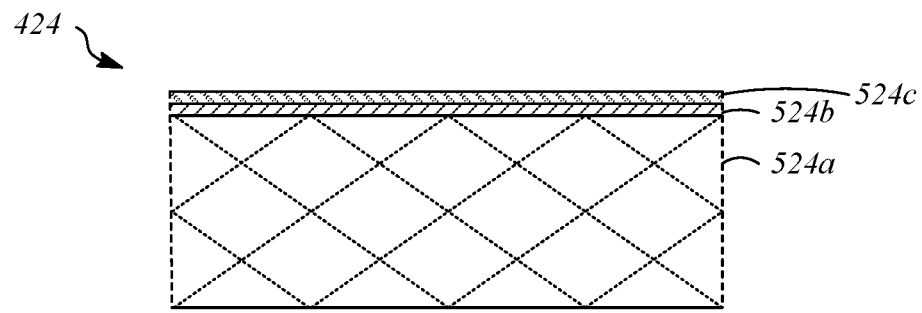
FIG. 5 is an illustration that shows an example of a second layer of the first example structure for the first panel of the panel assembly of FIG. 1, including variable light transmission.
Figure 6:
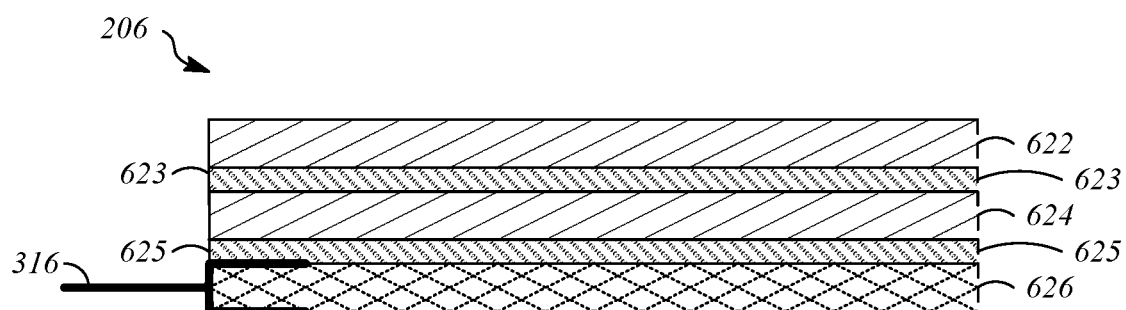
FIG. 6 is an illustration that shows a second example structure for the first panel of the panel assembly of FIG. 1.

FIG. 5 is an illustration that shows an example of the second layer 424 of the first example structure for the first panel 206 of FIG. 4, which includes variable light transmission. In the illustrated example, the second layer 424 includes a translucent or transparent material, 524a, such as glass or plastic. A variable light transmission film 524b and an electrode layer 524c are disposed on one of an upper surface (as illustrated) or a lower surface of the transparent material 524a. The variable light transmission film 524b may be a PDLC film, as previously described. The electrode layer 524c includes or is formed from a material that is able to conduct electricity to change the variable light transmission characteristic of the variable light transmission film 524b. The electrode layer 524c may include, for example, transparent electrodes, such as indium tin oxide (ITO) electrodes FIG. 6 is an illustration that shows a second example structure for the first panel 206. The first panel 206 is a laminated panel formed from layers that are transparent or translucent, or are capable of being transparent or translucent subject to control of active components, as will be described. In this implementation, the first panel 206 includes, in top-to-bottom order, a first layer 622, a first interlayer 623, a second layer 624, a second interlayer 625, and a third layer 626, which are joined together in a lamination process, for example, including application of heat and pressure.

The first layer 622 and the second layer 624 are transparent layers of glass or plastic (e.g., polycarbonate), as described with respect to the first layer 422 and the third layer 426 of FIG. 4. The third layer 626 is an active layer having a variable light transmission characteristic, as described with respect to the second layer 424 of FIG. 4. The third layer 626 is controllable by a control signal that is provided to the third layer 626 using the first electrical connection 316 to modify a degree of light transmission through the first panel 206. The implementation of FIG. 6 differs from the implementation in FIG. 4 in that the layer including the active component is an outer layer of the laminated structure.

The first layer 622 is bonded to the second layer 624 by the first interlayer 623, and the second layer 624 is bonded to the third layer 626 by the second interlayer 625. The first interlayer 623 and the second interlayer 625 are as described with respect to the first interlayer 423 and the second interlayer 425.

Figure 7:
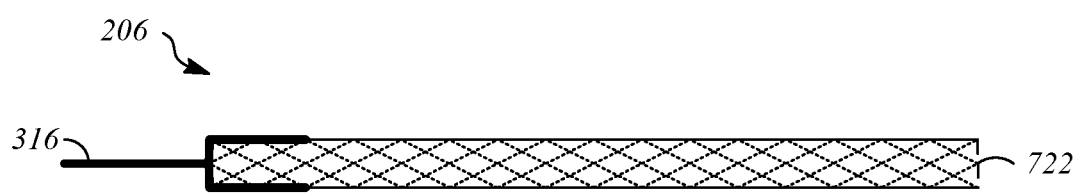
FIG. 7 is an illustration that shows a third example structure for the first panel of the panel assembly of FIG. 1.

In addition to the examples given in FIGS. 4, 6, and 7, other configurations of transparent panels that incorporate variable light transmission can be utilized for the first panel 206, including laminated panels and unlaminated panels.

FIG. 7 is an illustration that shows a third example structure for the first panel 206. The first panel 206, in this example, is a non-laminated panel that is transparent or translucent, or is capable of being transparent or translucent subject to control of active components. The first panel 206 includes a first layer that is connected to and controlled by the first electrical connection 316.

The first layer 722 is an active layer having a variable light transmission characteristic, as described with respect to the second layer 424 of FIG. 4. The first layer 722 is controllable by a control signal that is provided to the first layer 722 using the first electrical connection 316 to modify a degree of light transmission through the first panel 206. The implementation of FIG. 7 differs from the implementation in FIG. 4 in that the layer including the active component is not part of a laminated structure that includes multiple translucent or transparent layers of glass and/or plastic.

Figure 8:
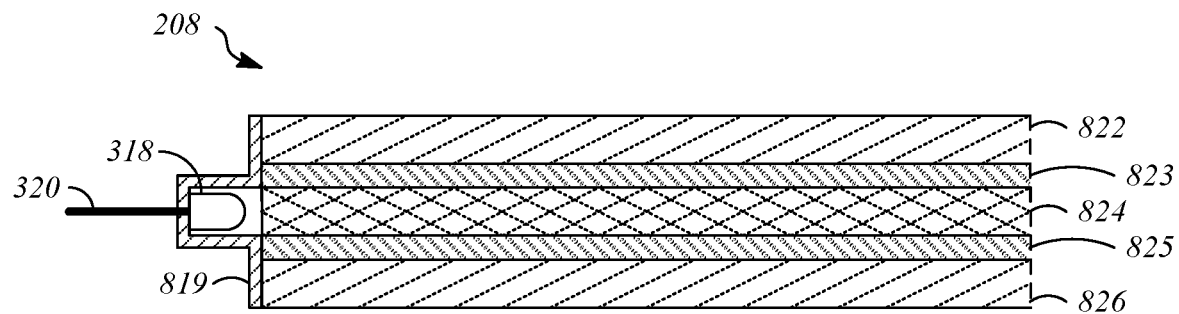
FIG. 8 is an illustration that shows a first example structure for the second panel of the panel assembly of FIG. 1.

FIG. 8 is an illustration that shows a first example structure for the second panel 208. The second panel 208 is a laminated panel formed from layers that are transparent or translucent. In this implementation, the second panel 208 includes, in top-to-bottom order, a first layer 822, a first interlayer 823, a second layer 824, a second interlayer 825, and a third layer 826, which are joined together in a lamination process, for example, including application of heat and pressure.

The first layer 822 and the third layer 826 are transparent layers of glass or plastic (e.g., polycarbonate), as described with respect to the first layer 422 and the third layer 426 of FIG. 4. The second layer 824 is an active layer that emits light.

The first layer 822 is bonded to the second layer 824 by the first interlayer 823, and the second layer 824 is bonded to the third layer 826 by the second interlayer 825. The first interlayer 823 and the second interlayer 825 are as described with respect to the first interlayer 423 and the second interlayer 425.

The second layer 824 is an edge-lit layer (e.g., a light guide plate) that receives light from an edge of the second panel 208. In the illustrated example, the light source 318 shines light into the edge of the second layer 824 of the second panel. As examples, the light source may be a light-emitting diode (LED) or an optical fiber that carries light from a remotely-located LED or laser. Other layers of the second panel 208 may be covered at their edges by a mask 819 such that the light emitted by the light source 318 does not enter them. The light emitted by the light source 318 is carried through the second layer 824 by total internal reflection or near-total internal reflection as a result of differing refractive indexes of the second layer 824 as compared to adjacent layers, such as the first interlayer 823 and the second interlayer 825. Features, such as edges, grooves, etching, surface patterning, or particles, may be formed in or disposed in the second layer 824 to direct the light out of the second layer 824 toward the third layer 826 in a desired manner.

Figure 9:
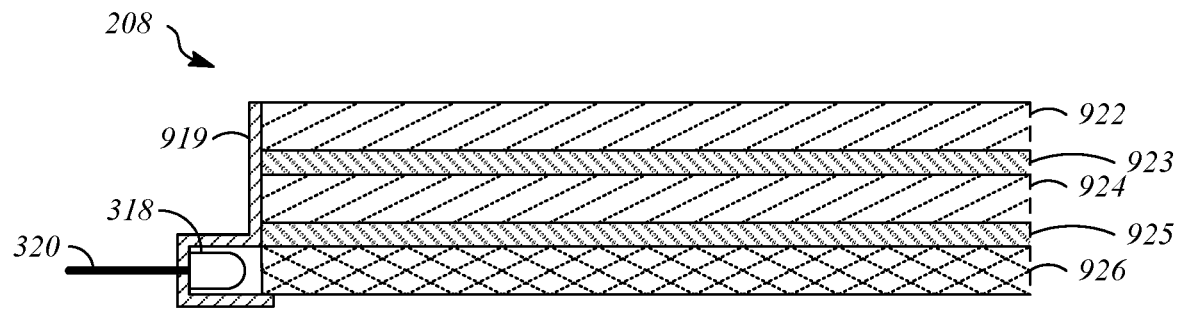
FIG. 9 is an illustration that shows a second example structure for the second panel of the panel assembly of FIG. 1.

FIG. 9 is an illustration that shows a second example structure for the second panel 208. The second panel 208 is a laminated panel formed from layers that are transparent or translucent. In this implementation, the second panel 208 includes, in top-to-bottom order, a first layer 922, a first interlayer 923, a second layer 924, a second interlayer 925, and a third layer 926, which are joined together in a lamination process, for example, including application of heat and pressure.

The first layer 922 and the second layer 924 are transparent layers of glass or plastic (e.g., polycarbonate), as described with respect to the first layer 822 and the third layer 826 of FIG. 8. The third layer 926 is an active layer that emits light.

The first layer 922 is bonded to the second layer 924 by the first interlayer 923, and the second layer 924 is bonded to the third layer 926 by the second interlayer 925. The first interlayer 923 and the second interlayer 925 are as described with respect to the first interlayer 823 and the second interlayer 825 of FIG. 8.

The second layer 924 is an edge-lit layer that receives light from an edge of the second panel 208. In the illustrated example, the light source 318, which may be a light-emitting diode (LED), shines light into the edge of the second layer 924 of the second panel. Other layers of the second panel 208 may be covered at their edges by a mask 919 such that the light emitted by the light source 318 does not enter them. The third layer 926 is similar to the second layer 824 of FIG. 8 and may be configured and implemented in the same way. The implementation of FIG. 9 differs from the implementation in FIG. 8 in that the layer including the active component is an outer layer of the laminated structure.

Figure 10:
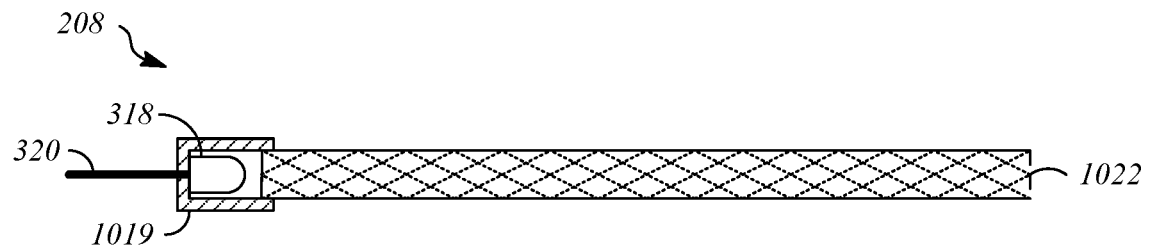
FIG. 10 is an illustration that shows a third example structure for the second panel of the panel assembly of FIG. 1.

FIG. 10 is an illustration that shows a third example structure for the second panel 208. The second panel 208, in this example, is a non-laminated panel that is transparent or translucent. The second panel 208 includes a first layer 1022 that is connected to and controlled by the first electrical connection 316.

The first layer 1022 is an active layer that emits light, as described with respect to the second layer 824 of FIG. 8. The first layer 1022 can be an edge-lit layer that receives light from an edge of the second panel 208 such as from the light source 318, with a mask 1019 covering the light source 318 to prevent light emitted by the light source from entering the first layer 1022 or other structures other than through the edge of the first layer 1022. The implementation of FIG. 10 differs from the implementation in FIG. 8 in that the layer including the active component is not part of a laminated structure that includes multiple translucent or transparent layers of glass and/or plastic.

Figure 11:
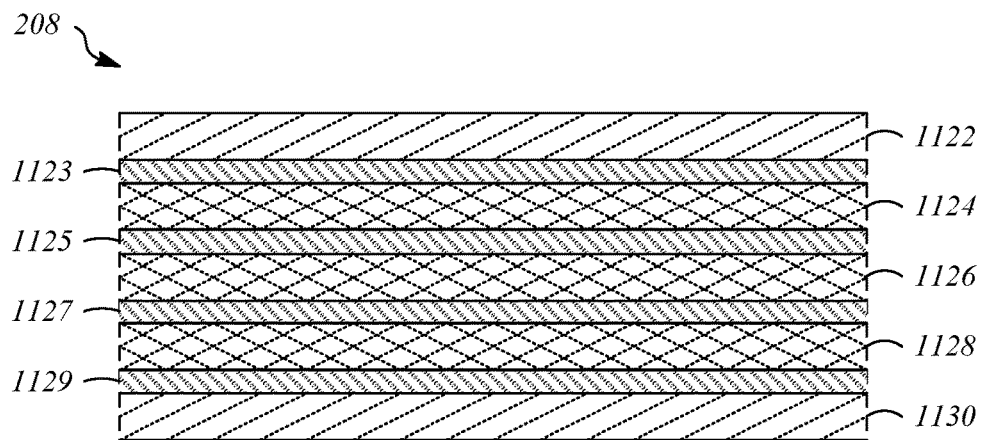
FIG. 11 is an illustration that shows a fourth example structure for the second panel of the panel assembly of FIG. 1.

FIG. 11 is an illustration that shows a fourth example structure for the second panel 208. The second panel 208 is a laminated panel formed from layers that are transparent or translucent. In this implementation, the second panel 208 includes, in top-to-bottom order, a first layer 1122, a first interlayer 1123, a second layer 1124, a second interlayer 1125, and a third layer 1126, a third interlayer 1127, a fourth layer 1128, a fourth interlayer 1129, and a fifth layer 1130, which are joined together in a lamination process, for example, including application of heat and pressure.

The first layer 1122 and the fifth layer 1130 are transparent layers of glass or plastic (e.g., polycarbonate), as described with respect to the first layer 822 and the third layer 826 of FIG. 8. The second layer 1124, the third layer 1126, and the fourth layer 1128 are active layers that have controllable properties that affect transmission and/or emission of light.

The second layer 1124 is a switchable mirror layer that is able to change states between a transparent or translucent state, and a reflective state. As an example, the state change can be induced by application of or cessation of application of a voltage to at least a portion of the second layer 1124. As one example, the second layer 1124 can incorporate a transition-metal hydride electrochromic device having reflective hydrides that change states between transparent or translucent and reflective upon application of a voltage. Other technologies can be used to implement a switchable mirror in the second layer 1124.

The third layer 1126 is an active layer that emits light. As examples, the second layer may be a transparent light-carrying layer, an edge-lit layer, a transparent or translucent OLED display device, or a transparent or translucent micro-LED device.

The first layer 1122 is bonded to the second layer 1124 by the first interlayer 1123, the second layer 1124 is bonded to the third layer 1126 by the second interlayer 1125, the third layer 1126 is bonded to the fourth layer 1128 by the third interlayer 1127, and the fourth layer 1128 is bonded to the fifth layer 1130 by the fourth interlayer 1129. The first interlayer 1123, the second interlayer 1125, the third interlayer 1127, and the fourth interlayer 1129 are as described with respect to the first interlayer 823 and the second interlayer 825 of FIG. 8.

It should be understood that details of the various implementations herein can be combined in various ways. For example, the panel assembly 104 can be implemented using any of the example implementations of the first panel 206 (e.g., as in FIGS. 4-7) in combination with any of the example implementations of the second panel 208 (e.g., as in FIGS. 8-11). Additional examples of controllable, light emitting panel structures that can be utilized as the second panel 208 can be found in U.S. patent application Ser. No. 15/366,686, filed on Dec. 1, 2015, which is entitled "Transparent Structure with Controllable Lighting," the contents of which are incorporated herein by reference in their entirety.

Figure 12:
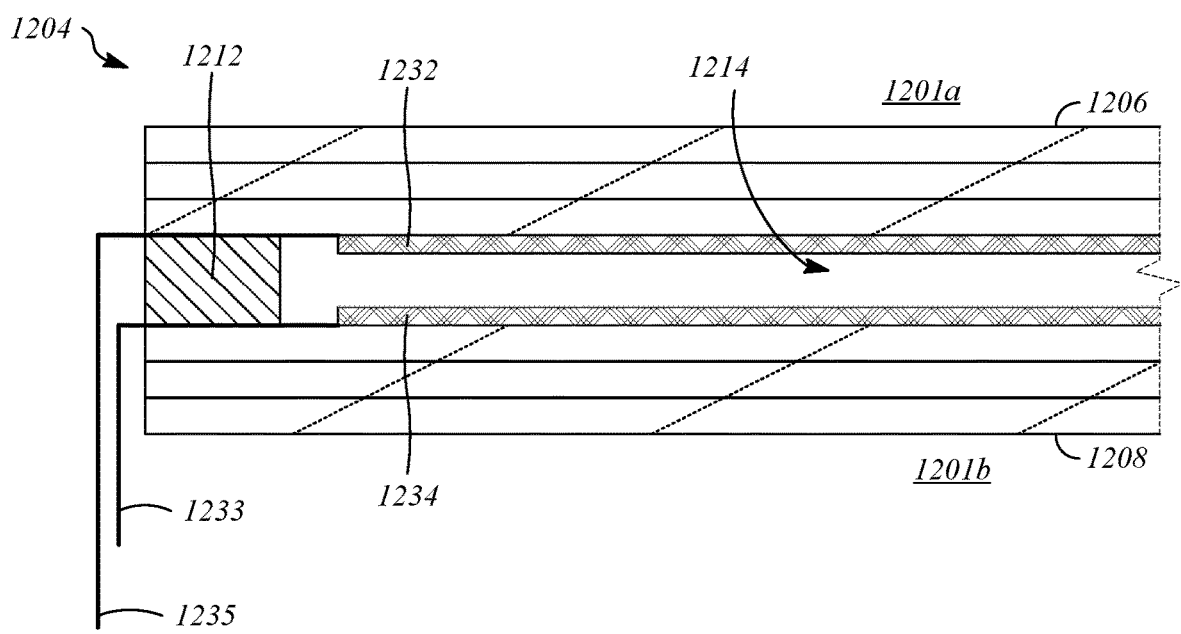
FIG. 12 is an illustration that shows a cross-section view of a panel assembly according to a second implementation.

FIG. 12 is an illustration that shows a cross-section view of a panel assembly 1204 according to an alternative implementation. The panel assembly 1204 is similar to the panel assembly 104, except as noted herein. For example, the panel assembly 1204 can be incorporated in the assembly 100, including connection to the frame 102, in the manner described with respect to the panel assembly 104.

The panel assembly 1204 includes a first panel 1206, a second panel 1208, spacers 1212, a gap 1214, a first active component 1232, and a second active component 1234. The first panel 1206 is positioned adjacent to a first side 1201a of the panel assembly 1204, and the second panel 1208 is positioned adjacent to a second side 1201b of the panel assembly 1204. In a typical implementation, an exterior space is located on the first side 1201a and an interior space is located on the second side 1201b.

The first panel 1206 and the second panel 1208 may each include a single layer of glass or plastic, or may be a laminated structure that includes multiple layers that are joined together in a lamination process, for example, including application of heat and pressure.

The spacers 1212 separate the first panel 1206 from the second panel 1208 to define the gap 1214, and may be positioned at the outer periphery of the panel assembly 1204 or may be positioned inward from the outer periphery of the panel assembly 1204. The gap 1214 may be evacuated or filled with a gas or gas mixture. The spacers 1212 may be configured such that they act as sealing structures to seal the space inside the gap 1214 from the exterior of the panel assembly 1204.

The first active component 1232 and the second active component 1234 are located in the gap 1214. A first electrical connector 1233 for the first active component 1232 and a second electrical connector 1235 for the second active component 1234 may extend out of the panel assembly 1204, for connection to a controller or other system. The first active component 1232 and the second active component 1234 each have a controllable characteristic. The first active component 1232 and the second active component 1234 may each be, for example, a variable light transmission device or a lighting device. Examples of variable light transmission devices include suspended particle devices, electrochromic devices, polymer dispersed liquid crystal devices, and guest host liquid crystal devices. Examples of variable lighting devices include edge lit panels (e.g., light guide plates), LED panels, micro LED panels, and display panels (e.g., translucent OLED panels).

The first active component 1232 is mounted on a lower surface (facing the gap 1214 of the first panel 1206. As an example, the first active component 1232 may be connected to the first panel 1206 by a conventional adhesive, such as a pressure sensitive adhesive (PSA). The first active component 1232 is not part of a laminated structure of the first panel 1206. In implementations in which the first panel 1206 is laminated, the lamination process is performed (e.g., including application of heat and pressure to bond multiple layers using interlayers), and the first active component 1232 is subsequently mounted to the first panel 1206.

The second active component 1234 is mounted on an upper surface (facing the gap 1214 of the second panel 1208. As an example, the second active component 1234 may be connected to the second panel 1208 by a conventional adhesive. The second active component 1234 is not part of a laminated structure of the second panel 1208. In implementations in which the second panel 1208 is laminated, the lamination process is performed (e.g., including application of heat and pressure to bond multiple layers using interlayers), and the second active component 1234 is subsequently mounted to the first panel 1206.

Although the example shown in FIG. 12, includes both the first active component 1232 and the second active component 1234, it should be understood that the panel assembly 1204 could include only one of the first active component 1232 or the second active component 1234, and omit the other.

Figure 13:
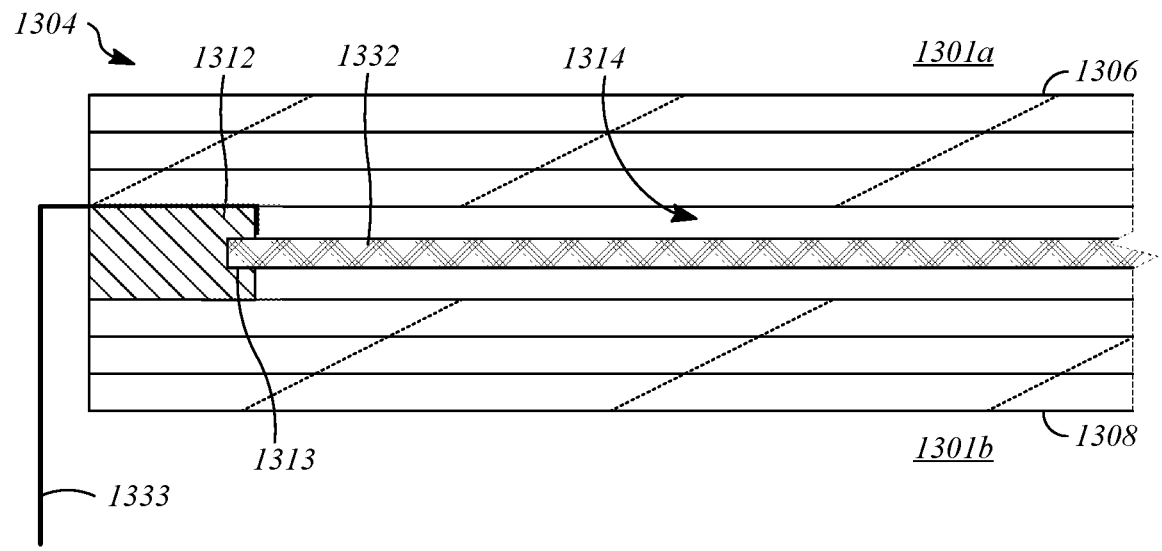
FIG. 13 is an illustration that shows a cross-section view of a panel assembly according to a third implementation.

FIG. 13 is an illustration that shows a cross-section view of a panel assembly 1304 according to an alternative implementation. The panel assembly 1304 is similar to the panel assembly 104, except as noted herein. For example, the panel assembly 1304 can be incorporated in the assembly 100, including connection to the frame 102, in the manner described with respect to the panel assembly 104.

The panel assembly 1304 includes a first panel 1306, a second panel 1308, spacers 1312, a gap 1314, and a first active component 1332. The first panel 1306 is positioned adjacent to a first side 1301a of the panel assembly 1304, and the second panel 1308 is positioned adjacent to a second side 1301b of the panel assembly 1304. In a typical implementation, an exterior space is located on the first side 1301a and an interior space is located on the second side 1301b.

The first panel 1306 and the second panel 1308 may each include a single layer of glass or plastic, or may be a laminated structure that includes multiple layers that are joined together in a lamination process, for example, including application of heat and pressure.

The spacers 1312 separate the first panel 1306 from the second panel 1308 to define the gap 1314, and may be positioned at the outer periphery of the panel assembly 1304 or may be positioned inward from the outer periphery of the panel assembly 1304. The gap 1314 may be evacuated or filled with a gas or gas mixture. The spacers 1312 may be configured such that they act as sealing structures to seal the space inside the gap 1314 from the exterior of the panel assembly 1304.

The first active component 1332 is located in the gap 1314. A first electrical connector 1333 for the first active component 1332 may extend out of the panel assembly 1304, for connection to a controller or other system. The first active component 1332 has a controllable characteristic. The first active component 1332 may be, for example, a variable light transmission device or a lighting device. Examples of variable light transmission devices include suspended particle devices, electrochromic devices, polymer dispersed liquid crystal devices, and guest host liquid crystal devices. Examples of variable lighting devices include edge lit panels (e.g., light guide plates), LED panels, micro LED panels, and display panels (e.g., translucent OLED panels).

The first active component 1332 is mounted in the gap 1314 between the first panel 1306 and the second panel 1308. The first active component 1332 may be spaced from the first panel 1306 and the second panel 1308. In the illustrated example, spacers 1312 include support structures, such as grooves 1313, that engage the first active component 1332 and suspend it within the gap 1314. Other support structures and/or spacers may alternatively be used to suspend the first active component 1332 in the gap 1314.

Although the example shown in FIG. 13, includes the first active component 1332 and does not depict other active components, it should be understood that additional active components (e.g., a second active component) could be disposed in the gap 1314 and supported similarly.

Figure 14:
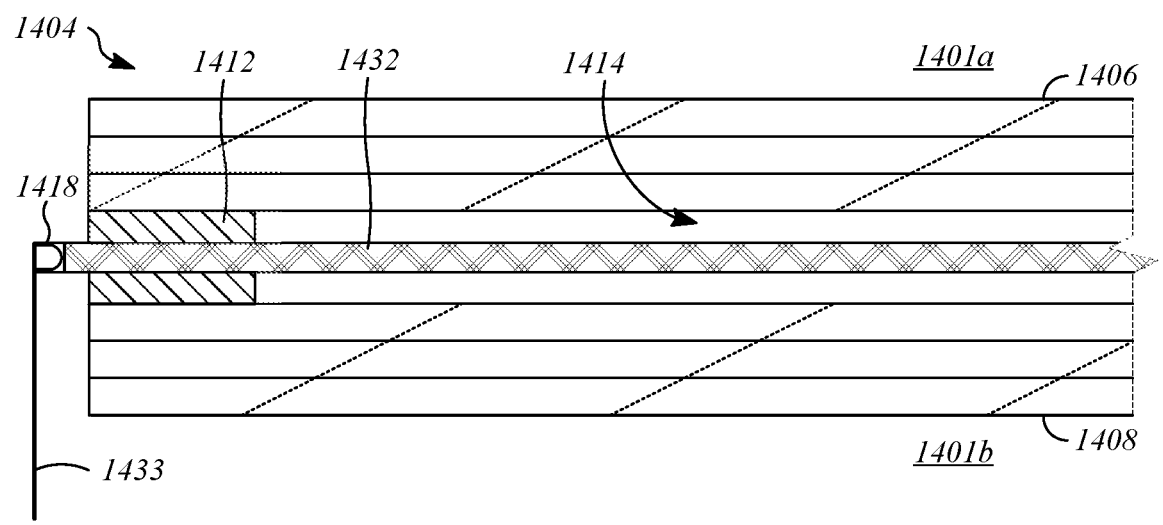
FIG. 14 is an illustration that shows a cross-section view of a panel assembly according to a fourth implementation.

FIG. 14 is an illustration that shows a cross-section view of a panel assembly 1404 according to an alternative implementation. The panel assembly 1404 is similar to the panel assembly 1304, except as noted herein. The panel assembly 1404 includes a first panel 1406, a second panel 1408, spacers 1412, a gap 1414, a lighting device 1418, a first active component 1432, which in the illustrated example is an edge lit panel (e.g., a light guide plate), and a first electrical connector 1433 for the first active component 1432. The first panel 1406 is positioned adjacent to a first side 1401a of the panel assembly 1404, and the second panel 1408 is positioned adjacent to a second side 1401b of the panel assembly 1404. In a typical implementation, an exterior space is located on the first side 1401a and an interior space is located on the second side 1401b.

The spacers 1412 separate the first panel 1406 from the second panel 1408 to define the gap 1414, and may be positioned at the outer periphery of the panel assembly 1404 or may be positioned inward from the outer periphery of the panel assembly 1404. The first active component 1432 extends through or between the spacers 1412, such that the first active component 1432 is suspended between the first panel 1406 and the second panel 1408. The lighting device 1418, such as an LED or a remotely-illuminated optical fiber, is located outward from the spacers 1412. The outer edge of the first active component 1432 is located outward from an outer edge of the first panel 1406 and/or the second panel 1408, and therefore may be located outside of the gap 1414.

In an alternative implementation, the first active component 1432 could be adjacent to (e.g., mounted with adhesive) one of the first panel 1406 or the second panel 1408, with the spacers 1412 located on the opposite side of the first active component 1432 to define the gap 1414.

Figure 15A:
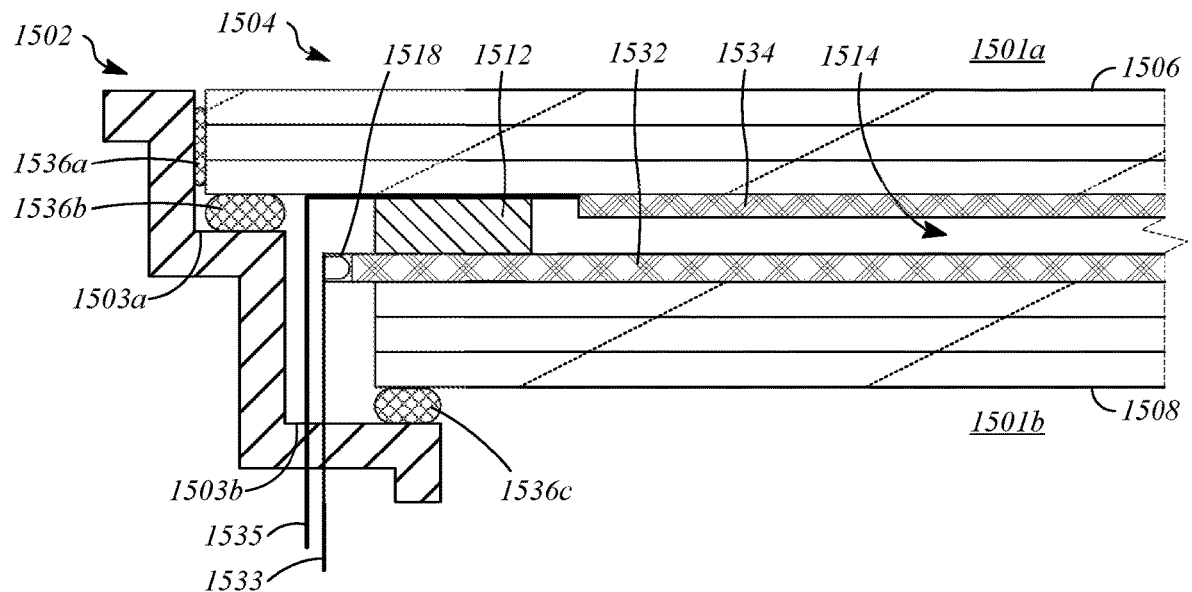
FIG. 15A is an illustration that shows a cross-section view of a panel assembly according to a fifth implementation.

FIG. 15A is an illustration that shows a cross-section view of a frame 1502 and a panel assembly 1504 according to an alternative implementation. The panel assembly 1504 is similar to the panel assembly 1304, except as noted herein. The panel assembly 1504 includes a first panel 1506, a second panel 1508, spacers 1512, a gap 1514, a lighting device 1518, and a first active component 1532, which in the illustrated example is an edge lit panel (e.g., a light guide plate), a first electrical connector 1533, a second active component 1534, such as a variable light transmission device, and a second electrical connector 1535. The first panel 1506 is positioned adjacent to a first side 1501a of the panel assembly 1504, and the second panel 1508 is positioned adjacent to a second side 1501b of the panel assembly 1504. In a typical implementation, an exterior space is located on the first side 1501a and an interior space is located on the second side 1501b.

The spacers 1512 separate the first panel 1506 from the second panel 1508 to define the gap 1514, and may be positioned at the outer periphery of one of the first panel 1506 or the second panel 1508 or may be positioned inward. The first active component 1532 extends past the spacers 1512, and is located between the spacers 1512 and the second panel 1508 in the illustrated example. The lighting device 1518, such as an LED or a remotely-illuminated optical fiber, is located outward from the spacers 1512, and therefore may be located outside of the gap 1514. The second active component 1534 is mounted (e.g., by adhesive) to a lower surface of the first panel 1506. The second active component 1534 is connected to the second electrical connector 1535, which extends past the spacers 1512, and may incorporate a bus bar that is mounted to or formed on the lower surface of the first panel 1506.

An outer edge of the first panel 1506 extends outward further than the second panel 1508 and the first active component 1532. At its outer edge, the first panel 1506 is supported by the frame 1502, such as by a first shoulder 1503a, and may be engaged with the first shoulder 1503a through a lateral seal 1536a and/or a vertical seal 1536b. An outer edge of the second panel 1508 may be located inward relative to the first panel 1506 and the first active component 1532, and may be supported by a second shoulder 1503b of the frame 1502 and a vertical seal 1536c. In some implementations, the second shoulder 1503b is omitted, and the panel assembly 1504 is suspended from the first shoulder 1503a.

The lighting device 1518 may be disposed in an open area defined between the frame 1502 and the panel assembly 1504, below the first shoulder 1503a and the second shoulder 1503b. An encapsulating material (not shown) may be provided on the outer periphery of the panel assembly 1504.

As alternatives, the first active component 1532 may be in contact with a lower surface of the first panel 1506 or an upper surface of the second panel 1508 (e.g., bonded by adhesive) with the spacers 1512 located on the opposite side of the first active component 1532 in order to define the gap 1514.

Figure 15B:
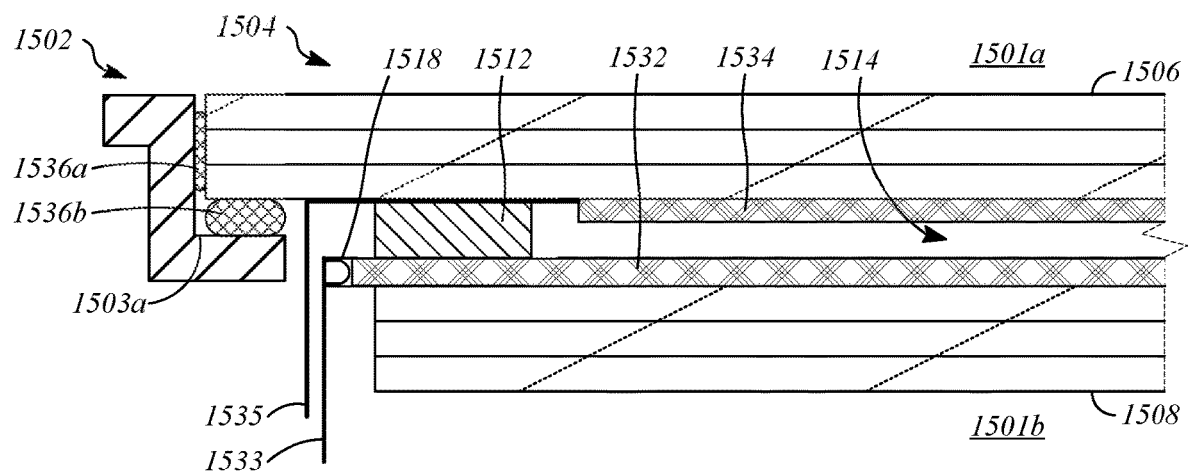
FIG. 15B is an illustration that shows a cross-section view of a panel assembly according to a sixth implementation.

FIG. 15B is an illustration that shows a cross-section view of the frame 1502 and the panel assembly 1504 according to an alternative implementation in which the frame 1502 omits the second shoulder 1503b and the panel assembly 1504 is instead supported solely or primarily by supporting the first panel 1506 using the first shoulder 1503a.

Figure 16:
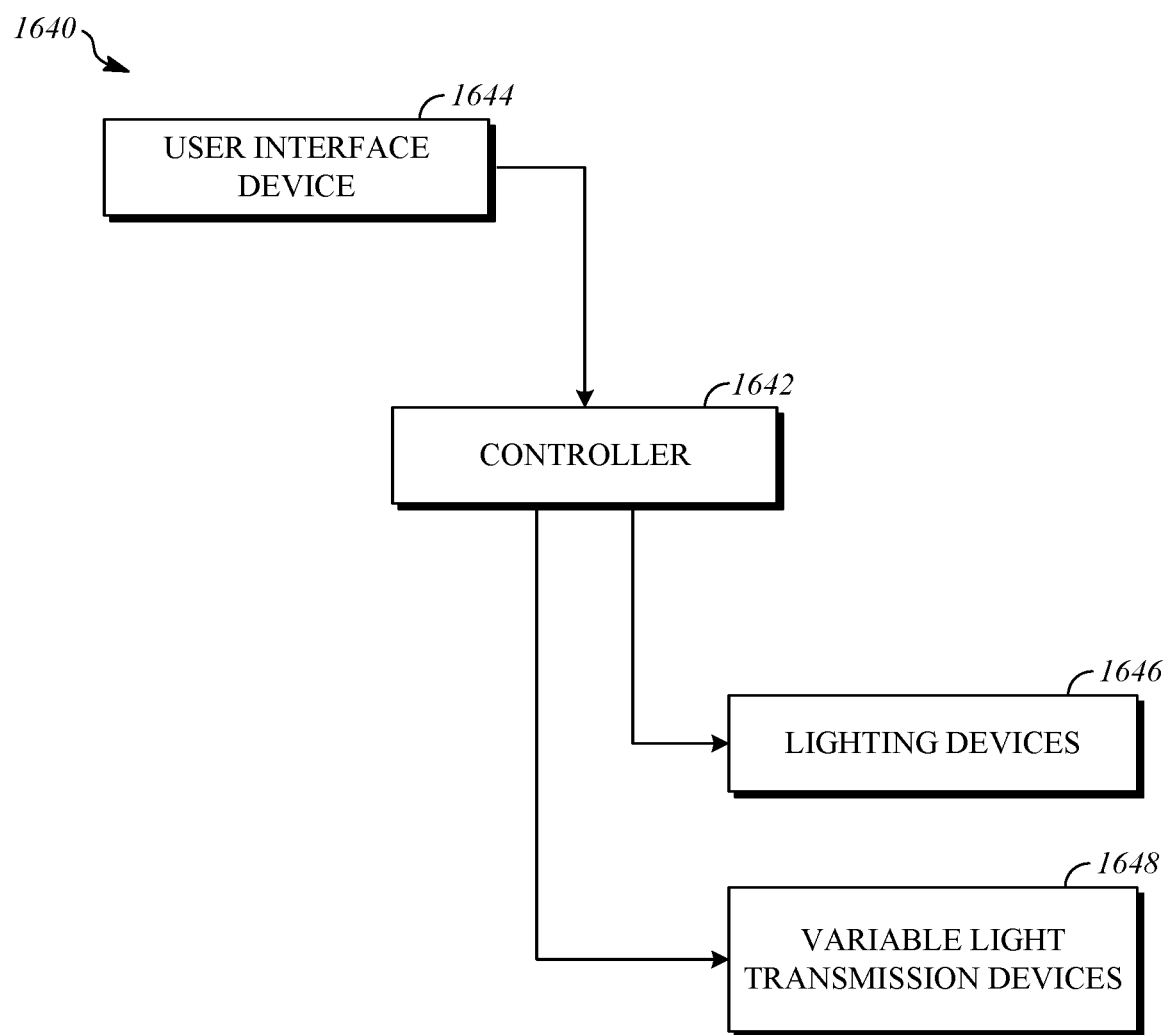
FIG. 16 is a block diagram that shows a lighting system.

FIG. 16 is a block diagram that shows a lighting system 1640. The lighting system 1640 may include a controller 1642, a user interface device 1644, lighting devices 1646, and variable light transmission devices 1648. The controller 1642 coordinates operation of the various components of the lighting system 1640 by communicating electronically (i.e., wired or wireless communications) with the user interface device 1644, the lighting devices 1646, and the variable light transmission devices 1648. The controller 1642 may receive information (e.g., signals and/or data) from the user interface device 1644 and/or from other components of the lighting system 1640. The lighting system 1640 may be used in connection with and include components of the assembly 100.

The user interface device 1644 allows a user to modify aspects of the operation of the lighting system 1640, and to set a desired state for the lighting system 1640. The user interface device 1644 can allow modification of operating parameters of the lighting devices 1646 and the variable light transmission devices 1648.

The lighting devices 1646 may be electric lighting devices that are controllable by the controller 1642. For example, controller may output a signal to turn on, turn off, change intensity, or change color of the lighting devices 1646.

The variable light transmission devices 1648 utilize variable light transmission technologies to transmission of light through a structure that otherwise allows transmission of light, such as a glass panel. The variable light transmission devices 1648 may be operated by a control signal, such as a signal from the controller 1642. The control signal may cause the variable light transmission devices 1648 to modify a current light transmission characteristic, for example, from a first light transmission value to having a second light transmission value that is different than the first light transmission value, or from a light transmitting state to a light reflecting (mirror) state. Technologies that may be used to implement the variable light transmission devices 1648 include suspended particle devices, electrochromic devices, polymer dispersed liquid crystal devices, and guest host liquid crystal devices.

Figure 17:
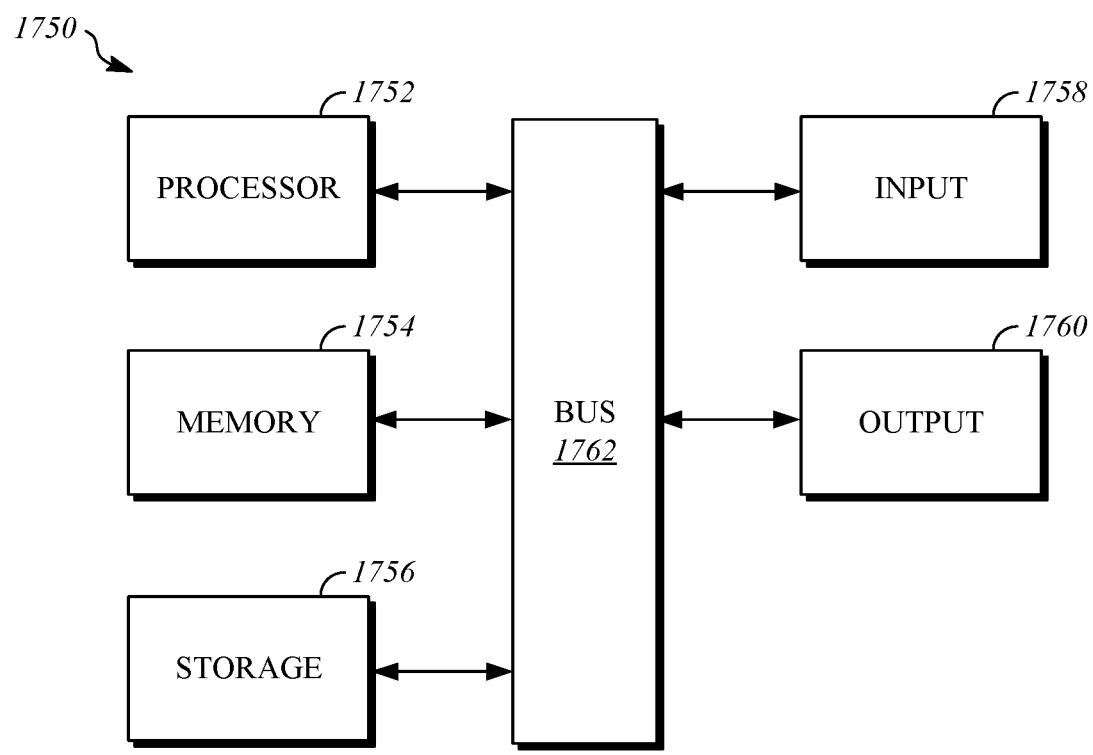
FIG. 17 is an illustration showing an example of a hardware configuration for a controller.

FIG. 17 shows an example of a hardware configuration for a controller 1750 that may be used to implement the controller 1642 and/or other portions of the lighting system 1640. In the illustrated example, the controller 1750 includes a processor 1752, a memory 1754, a storage device 1756, one or more input devices 1758, and one or more output devices 1760. These components may be interconnected by hardware such as a bus 1762 that allows communication between the components. The processor 1752 may be a conventional device such as a central processing unit, and is operable to execute computer program instructions and perform operations described by the computer program instructions. The memory 1754 may be a volatile, high-speed, short-term information storage device such as a random-access memory module. The storage device 1756 may be a non-volatile information storage device such as a hard drive or a solid-state drive. The input devices 1758 may include any type of human-machine interface, such as buttons, switches, a keyboard, a mouse, a touchscreen input device, a gestural input device, or an audio input device. The output devices 1760 may include any type of device operable to provide an indication to a user regarding an operating state, such as a display screen or an audio output.

What is claimed is:

1. A light transmitting panel assembly, comprising:
a first panel that is positioned adjacent to a first side of the assembly;
a second panel that is positioned adjacent to an opposed second side of the assembly, the second panel includes a first transparent glass layer, a first active layer that is configured to change states between a translucent state and a reflective state, a second active layer that is configured to emit light, and a second transparent glass layer; and
a frame that supports the first panel and the second panel, wherein the first panel and the second panel are separated from each other by a gap.

2. The light transmitting panel assembly of claim 1, wherein the second panel further includes a first interlayer that is located between the first transparent glass layer and the first active layer to bond the first transparent glass layer to the first active layer, a second interlayer that is located between the first active layer and the second active layer to bond the first active layer to the second active layer, and a third interlayer that is located between the second active layer and the second transparent glass layer to bond the second active layer to the second transparent glass layer.

3. The light transmitting panel assembly of claim 2, wherein the first panel includes a third transparent glass layer, a third active layer that is configured to alter an amount of light that passes through the light transmitting panel assembly, and a fourth transparent glass layer.

4. The light transmitting panel assembly of claim 3, wherein the third active layer is variable between a translucent state and an opaque state.

5. The light transmitting panel assembly of claim 3, wherein the first panel further includes a fourth interlayer that is located between the third transparent glass layer and the third active layer to bond the third transparent glass layer to the third active layer, and a fifth interlayer that is located between the third active layer and the fourth transparent glass layer to bond the third active layer to the fourth transparent glass layer.

6. The light transmitting panel assembly of claim 3, wherein the first panel further includes a fourth interlayer that is located between the third transparent glass layer and the fourth transparent glass layer to bond the third transparent glass layer to the fourth transparent glass layer, and a fifth interlayer that is located between the fourth transparent glass layer and the third active layer to bond the fourth transparent glass layer to the third active layer.

7. The light transmitting panel assembly of claim 6, wherein the third active layer is positioned adjacent to the gap.

8. The light transmitting panel assembly of claim 1, wherein the second panel further includes a third active layer that is configured to alter an amount of light that passes through the light transmitting panel assembly.

9. The light transmitting panel assembly of claim 3, wherein the third active layer is variable between a translucent state and an opaque state.

10. The light transmitting panel assembly of claim 8, wherein the second panel further includes a first interlayer that is located between the first transparent glass layer and the first active layer to bond the first transparent glass layer to the first active layer, a second interlayer that is located between the first active layer and the second active layer to bond the first active layer to the second active layer, a third interlayer that is located between the second active layer and the third active layer to bond the second active layer to the third active layer, and a fourth interlayer that is located between the third active layer and the second transparent glass layer to bond the third active layer to the second transparent glass layer.

11. The light transmitting panel assembly of claim 1, wherein the second active layer is configured to enable control of an amount of light that is emitted by the second active layer.

12. A light transmitting panel assembly, comprising:
a first panel that is positioned adjacent to a first side of the assembly;
a second panel that is positioned adjacent to an opposed second side of the assembly;
a spacer that is positioned between and abuts the first panel and the second panel, to separate the first panel from the second panel and define a gap between the first panel and the second panel; and
an active component that is supported by the spacer such that the active component is suspended in the gap and spaced from the first panel and the second panel.

13. The light transmitting panel assembly of claim 12, wherein the spacer includes a support portion that engages the active component.

14. The light transmitting panel assembly of claim 13, wherein the support portion comprises a groove that receives an outer edge of the active component.

15. The light transmitting panel assembly of claim 12, wherein the active component extends through the spacer.

16. The light transmitting panel assembly of claim 15, wherein the active component is an edge lit panel having lighting devices, and wherein the active component extends through the spacer such that the lighting devices are located outside the gap.

17. The light transmitting panel assembly of claim 12, wherein the active component is a first active component, and
wherein the light transmitting panel assembly further comprises a second active component that is supported by the spacer such that the second active component is suspended in the gap.

18. A light transmitting panel assembly, comprising:
a first panel that is positioned adjacent to a first side of the assembly;
a second panel that is positioned adjacent to an opposed second side of the assembly;
a spacer that is positioned between the first panel and the second panel, the spacer defining a gap between the first panel and the second panel; and
an active component that is supported by the spacer such that the active component is suspended in the gap and spaced from the first panel and the second panel,
wherein the active component has a controllable light emission characteristic, and
wherein the first panel includes a first transparent glass layer, an active layer that is configured to alter an amount of light that passes through the light transmitting panel assembly, and a second transparent glass layer.

19. The light transmitting panel assembly of claim 18, wherein the active layer is variable between a translucent state and an opaque state.

20. A light transmitting panel assembly, comprising:
a first panel that is positioned adjacent to a first side of the assembly;
a second panel that is positioned adjacent to an opposed second side of the assembly;
a spacer that is positioned between the first panel and the second panel, the spacer defining a gap between the first panel and the second panel; and
an active component that is supported by the spacer such that the active component is suspended in the gap and spaced from the first panel and the second panel,
wherein the active component is variable between a translucent state and an opaque state to alter an amount of light that passes through the light transmitting panel assembly, and
wherein the second panel includes a first transparent glass layer, an active layer that has a controllable light emission characteristic, and a second transparent glass layer.

21. The light transmitting panel assembly of claim 15, wherein an outer edge of the active component is located outward from an outer edge of the first panel and an outer edge of the second panel.

22. The light transmitting panel assembly of claim 15, wherein an outer edge of the active component is located outside of the gap.

* * * * *